US009224050B2

(12) United States Patent
Elinas et al.

(10) Patent No.: US 9,224,050 B2
(45) Date of Patent: Dec. 29, 2015

(54) VEHICLE LOCALIZATION IN OPEN-PIT MINING USING GPS AND MONOCULAR CAMERA

(75) Inventors: Pantelis Elinas, Glebe (AU); Linthotage Dushantha Lochana Perera, Boralesgamuwa (LK); Eric Nettleton, Kellyville (AU); Hugh Durrant-Whyte, Rozelle (AU)

(73) Assignee: The University of Sydney, The University of Sydney, New South Wales (AU)

( * ) Notice: Subject to any disclaimer, the term of this patent is extended or adjusted under 35 U.S.C. 154(b) by 308 days.

(21) Appl. No.: 13/049,822

(22) Filed: Mar. 16, 2011

(65) Prior Publication Data
US 2011/0299730 A1     Dec. 8, 2011

(30) Foreign Application Priority Data
Mar. 16, 2010   (AU) ................................ 2010901088

(51) Int. Cl.
*G06K 9/00*     (2006.01)
*G06T 7/00*     (2006.01)

(52) U.S. Cl.
CPC .......... *G06K 9/00791* (2013.01); *G06T 7/0042* (2013.01); *G06K 2209/23* (2013.01); *G06T 2207/10016* (2013.01); *G06T 2207/30236* (2013.01)

(58) Field of Classification Search
None
See application file for complete search history.

(56) References Cited

U.S. PATENT DOCUMENTS

| 5,809,161 | A * | 9/1998 | Auty et al. ................... 382/104 |
| 7,339,525 | B2 * | 3/2008 | Zimmerman et al. ........ 342/464 |
| 7,698,108 | B2 * | 4/2010 | Haney et al. .................. 702/189 |
| 8,125,529 | B2 * | 2/2012 | Skoskiewicz et al. ..... 348/211.2 |
| 8,355,539 | B2 * | 1/2013 | Tan et al. ....................... 382/104 |
| 2003/0210807 | A1 * | 11/2003 | Sato et al. ..................... 382/104 |
| 2006/0022870 | A1 * | 2/2006 | Zimmerman et al. ........ 342/464 |
| 2006/0279630 | A1 * | 12/2006 | Aggarwal et al. ............. 348/143 |
| 2007/0039030 | A1 * | 2/2007 | Romanowich et al. ....... 725/105 |
| 2007/0122058 | A1 * | 5/2007 | Kitaura et al. ................ 382/284 |

(Continued)

OTHER PUBLICATIONS

Brown et al "Monitoring of Open Pit mines using combined GNSS satellite receivers and robotic total stations".*

(Continued)

*Primary Examiner* — Tsung-Yin Tsai
(74) *Attorney, Agent, or Firm* — Blakely, Sokoloff, Taylor & Zafman LLP

(57) ABSTRACT

Described herein is a method and system for vehicle localization in an open pit mining environment having intermittent or incomplete GPS coverage. The system comprises GPS receivers associated with the vehicles and providing GPS measurements when available, as well as one or more cameras 50,55 overlooking the mine region 10. The cameras 50,55 are at a known location and are used for generating a sequence of images in a field of view with predetermined calibration in a fixed coordinate system. The system further comprises a vehicle recognition processor 120 for analyzing individual images from the camera to identify and locate within an image a vehicle in the mine region, as well as a vehicle tracking processor 130 for analyzing a sequence of images from the camera to track the identified vehicle location in the sequence of images. A data fusion processor 160 is coupled to receive GPS measurements, when available, from the vehicle GPS receivers, to fuse the received GPS measurement and corresponding vehicle image location, and to output a vehicle localization output 125.

13 Claims, 12 Drawing Sheets

(56) References Cited

U.S. PATENT DOCUMENTS

| | | | |
|---|---|---|---|
| 2009/0028440 A1* | 1/2009 | Elangovan et al. | 382/216 |
| 2010/0026577 A1* | 2/2010 | Hanson | 342/387 |
| 2012/0105625 A1* | 5/2012 | Richardson et al. | 348/135 |

OTHER PUBLICATIONS

Vega, Antonio Nieto, "Development of real-time proximity warning and 3D mapping system bsae on wireless networks, virtual reality graphic, and GPS to improve safety in open-pit mines".*

Adam Baumberg, IEEE Conference on Computer Vision and Pattern Recognition, vol. 1, pp. 774-781, 2000.

J. Matas et al., Robust Wide Baseline Stereo from Maximally Stable Extremal Regions, British Machine Vision Conference, pp. 384-393, 2002.

David G. Lowe, Object Recognition from Local Scale-Invariant Features, International Conference on Computer Vision, vol. 2, pp. 1150-1157, 1999.

Franscesc Moreno-Noguer, et al, Integration of Dependent Bayesian Filters for Robust Tracking, In Proceedings of IEEE International Conference on Robotics and Automation, pp. 4081-4087, May 2006.

Z. Zhang, Flexible Camera Calibration by Viewing a Plane From Unknown Orientations, International Conference on Computer Vision, vol. 1, pp. 666-673, 1999.

Z. Zhang, A Flexible New Technique for Camera Calibration, IEEE Transactions on Pattern Analysis and Machine Intelligence, vol. 22, No. 11, pp. 1330-1334, Nov. 2000.

* cited by examiner

VEHICLE LOCALIZATION IN OPEN-PIT MINING USING GPS AND MONOCULAR CAMERA

FIELD OF APPLICATION

This invention relates to the field of vehicle localization in an open pit mining environment.

BACKGROUND

Localization is the problem of determining the position and attitude of a vehicle with respect to some fixed coordinate system. Autonomous localization methods offer additional challenges in dealing with high degrees of sensor uncertainty, in interpretation of terrain and environment observations, and in the need to make robust autonomous decisions on the basis of ambiguous sensor data.

In an open pit mining environment the accurate localization of vehicles as they go about the pit is important for both controlling the process accurately and increasing safety. Accurately knowing the position and velocity of any vehicle as it goes about the mine is particularly important for supporting automation systems.

It is common practice in open pit mining that vehicles are localized using satellite positioning systems (GPS). Due to the geometry of an open pit mine, there are several locations where GPS fails because of an insufficient number of satellites being visible, multi-path effects of local terrain and periodic signal blockage due to foliage or places having restricted view of the sky. Accordingly, GPS localization alone may not provide all of the capabilities required in an application such as autonomous mining.

It will be understood that any reference herein to prior art is not to be taken as an admission as to the common general knowledge of a person skilled in the art.

SUMMARY OF THE INVENTION

In one aspect the invention provides a method for vehicle localization in an open pit mining environment, comprising: providing a camera calibrated in a fixed coordinate system with a field of view encompassing a region of vehicle operation in the mining environment; analysing at least one picture frame from the camera using a vehicle recognition algorithm to determine the presence of a vehicle in the camera field of view; analysing a sequence of picture frames from the camera using a vehicle tracking algorithm to determine an image position of the vehicle within the region of vehicle operation; ascertaining at least one independent measure of the vehicle location within the region of vehicle operation relative to the fixed coordinate system; and providing an output of vehicle localization over time using the image position of the vehicle and the at least one independent vehicle location measurement.

The independent measure of vehicle location may be available intermittently and if the independent measure is unavailable the method comprises: providing the output of vehicle localization over time dependent on the image position of the vehicle. The independent measure of vehicle location may be a measurement from a GPS receiver.

The method may also further comprise the steps of: providing a plurality of cameras calibrated in the fixed coordinate system with respective fields of view encompassing the region of vehicle operation in the mining environment; determining respective image positions of the vehicle from picture frames of at least two cameras; and providing the output of vehicle localization over time dependent on the respective image positions and, if available, the independent vehicle location measurement. Bayesian filtering may be applied to provide the output of vehicle localization. The Bayesian filtering may use a Kalman filter or a particle filter.

The method may further comprise calibrating the camera field of view in the fixed coordinate system. In the method, at least one camera may be mounted on a camera-support vehicle and the method may comprise calibrating a field of view of the mounted camera in the fixed coordinate system.

In another aspect the invention provides a method for continuous vehicle localization in an open pit mining environment in which vehicles carrying GPS receivers operate in a region of intermittent or incomplete GPS coverage, comprising: generating digital images with a field of view overlooking the mine region from a fixed location as vehicles move about the mine; processing the digital images by analysing the image data to identify the presence and location of a vehicle in an image; and fusing the identified image location of the vehicle with a measurement from the corresponding vehicle GPS receiver to provide continuous vehicle localization data.

In another aspect the invention provides a system for localization of vehicles in an open pit mining environment having intermittent or incomplete GPS coverage, comprising: GPS receivers associated with the vehicles and providing GPS measurements when available; a camera overlooking the mine region from a known location for generating a sequence of images in a field of view with predetermined calibration in a fixed coordinate system; a vehicle recognition processor for analysing individual images from the camera to identify and locate within an image a vehicle in the mine region; a vehicle tracking processor for analysing a sequence of images from the camera to track the identified vehicle location in the sequence of images; and a data fusion processor coupled to receive GPS measurements, when available, from the vehicle GPS receivers, to fuse the received GPS measurement and corresponding vehicle image location, and to output a vehicle localization output.

The system may further comprise a plurality of cameras, wherein the data fusion processor fuses the received GPS measurement with corresponding vehicle image locations derived from images from the plurality of cameras. One or more of the cameras may be mobile.

The data fusion processor of the system may comprise a Bayesian filter selected from the group consisting of a Kalman filter and a particle filter.

As used herein, except where the context requires otherwise, the term "comprise" and variations of the term, such as "comprising", "comprises" and "comprised", are not intended to exclude further additives, components, integers or steps.

BRIEF DESCRIPTION OF THE DRAWINGS

The following description explains details of the invention to enable it to be more fully understood in the context of an embodiment thereof, also referring to the illustrations in the accompanying drawings in which.

DETAILED DESCRIPTION

1. System Overview

Cameras (usually fixed) may be used to observe specific activities occurring within open pit mines, from the localized control centre, which controls and co-ordinates such things as vehicle dispatch. In mining operations, controllers responsible for the daily operation of mines may be located at a Remote Operations Center (ROC). A high-speed data-link sends to the ROC data about the state of the relevant mine and equipment in real-time. Part of the data stream comprises a video feed from a number of CCTV cameras installed at various locations overlooking the pit. These cameras may have powerful zoom and pan/tilt capabilities allowing the engineers to visually observe the state of the operation. In the following there is described a vision system that may be used for vehicle localization in such a mine environment.

Figure 1A:
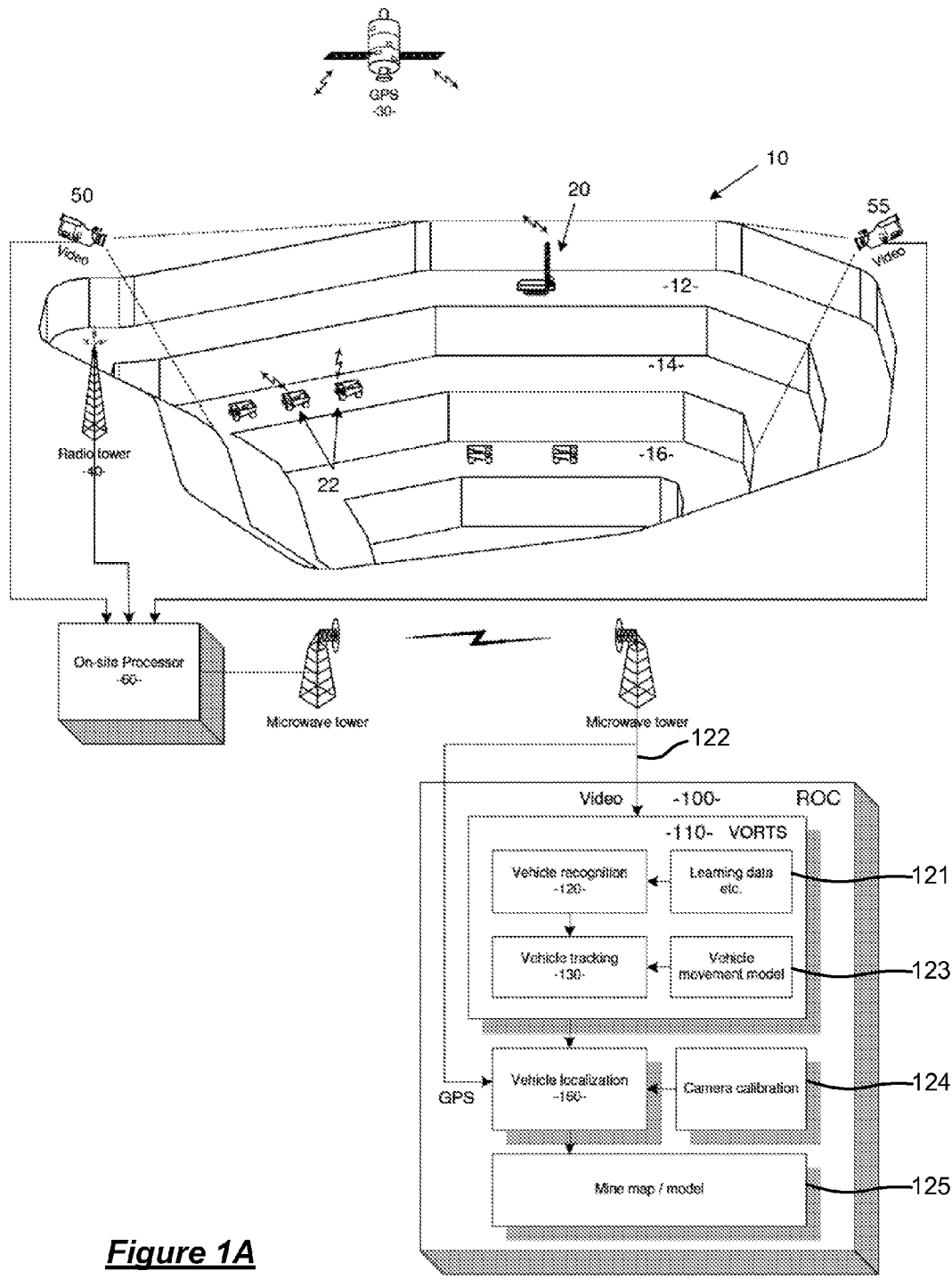
FIG. 1A is a diagrammatic illustration of a system for vehicle localization in an open pit mining environment.

A system for vehicle localization in an open pit mining environment is illustrated diagrammatically in FIG. 1A. In the drawing there is shown an open pit mine 10 having a number of benches 12, 14, 16. During mining operations various vehicles move about the mine, such as surface drilling rig 20 and haulage trucks 22. The vehicles may have human operators or may operate autonomously, but in either case it is important to know where each vehicle is within the mining environment. To that end, each vehicle is equipped with a GPS receiver for receiving signals from GPS satellites 30. A suitable GPS system for this application is the HOLUX M-241 Wireless GPS Logger. In general the vehicle GPS receiver is able to determine the vehicle location within the mine, which can then be used on-board the vehicle, at the mine site and/or communicated to the remote operations centre. However there are locations and situations in a mining environment in which GPS localization fails and supplementary methods must be used in order to keep track of current vehicle positions. The system described herein utilises one or more video cameras 50, 55 with a view of the mine environment in order to recognise, track and, with the use of possibly intermittent GPS data, localize vehicles within the mine.

As shown in FIG. 1A, video cameras 50, 55 are positioned with respective fields of view encompassing the mine pit 10. Cameras such as the Point Grey Research Grasshopper, model GRAS-20S4C-C, may be used. The cameras may be mounted at fixed locations. Alternatively, some or all of the video cameras may be mounted on vehicles, allowing the location of the video cameras to be changed. The vehicles may include autonomous vehicles that may be operated without human drivers. The vehicles may use GPS equipment to establish the camera location.

A radio communications receiver 40 is provided at the mine site for receiving communications signals from the mine vehicles which may include periodic relay of each vehicle's GPS coordinates. Video signals from the cameras and GPS data from the vehicles are relayed from an on-site processor 60 to a remote operations centre (ROC) 100, such as by way of a microwave transmission system or other suitable long-distance digital communications medium. The ROC 100 receives the video feed and vehicle GPS location data and processes information contained therein to determine vehicle localization as described hereinbelow.

The remote operations centre 100 includes a Visual Object Recognition and Tracking System (VORTS) 110, which is a visual processing module designed to automatically recognize and track open pit mine entities using as input low-resolution video data 122 from the remote-controlled CCTV cameras (50, 55). As the live video stream data 122 arrives at the ROC, it is input to the VORTS which processes the images in a vehicle recognition module 120 to determine vehicle identification data, and in a vehicle tracking module 130 that uses a vehicle movement model 123 to provide trajectory date. The vehicle identification and trajectory data are sent to a vehicle localization module 160 that takes into account the camera calibration 124, and where it is fused with available vehicle GPS data to obtain a more accurate vehicle localization model 125.

2. Object Recognition

The learning data for relevant vehicles in the mine 10 are stored for access by the VORTS 110. The first component 120 of the VORTS 110 relates to visual object recognition. Given an image sourced from the mine site camera, the vehicle recognition module 120 is used to determine if a particular vehicle is present in the image and, if so, where the vehicle is in the image. In order to answer these two questions, an appearance model for each vehicle must be learnt from the learning data 121. State-of-the-art visual object recognition algorithms utilize local features to learn an appearance model for an object from one or more example images. This approach is computationally effective because not all pixels in an image need to be processed while those that are actually utilized are selected for their unique properties of repeatability, distinctiveness, invariance under changes in affine transformations and illumination. These pixels are known in the literature as interest or corner points.

Figure 2:
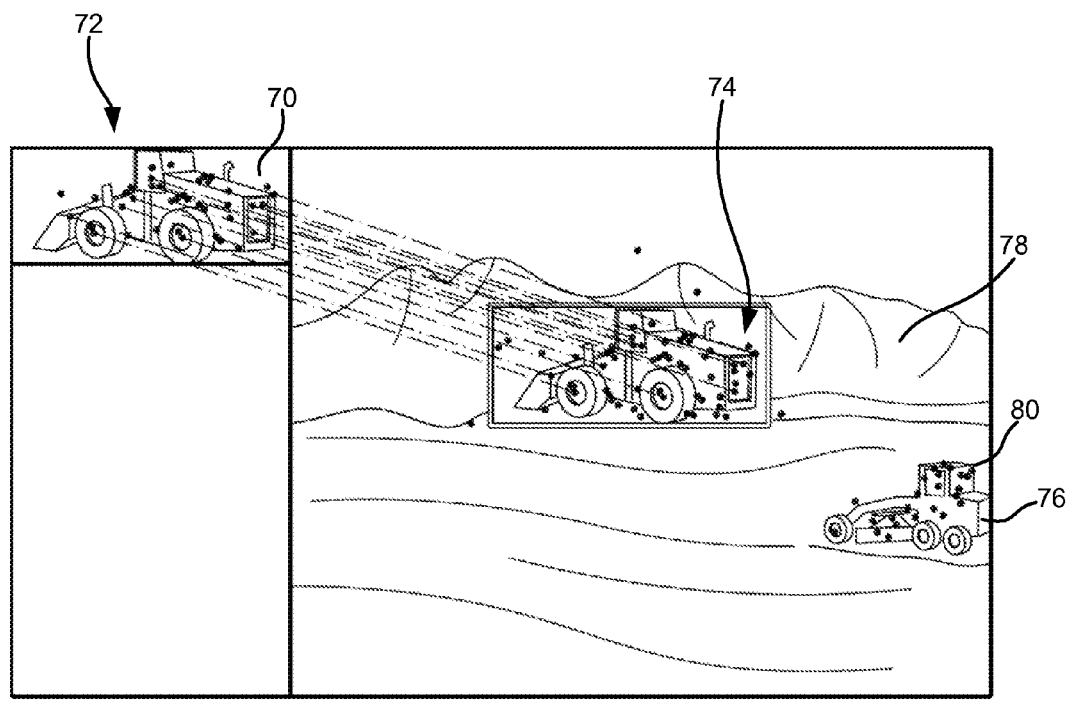
FIG. 2 is an image illustrating automatic vehicle recognition from camera data.

FIG. 2 shows an example of object recognition using this method. The Figure represents a screen shot from video data that has been redrawn diagrammatically. The interest points (e.g. 70) selected as the most stable for matching are drawn on the images as black dots. Both the model image of a dozer 72 and a query image that includes the same vehicle 74, a grader 76 and a never before seen background 78 are shown in FIG. 2. The matching key points between the model image 72 (shown at the top left of the Figure) and those of the query image 74 are connected with lines. The location of the dozer 74 in the image detected using a fully automatic method is also shown using a rectangle with a thick border. Key points (e.g. 80) detected on the grader 76 have correctly been identified as not belonging to the dozer 74 (there are no lines connecting these key points with any in the model image.) The same is true for the small number of key points belonging to the background.

There are several aspects of visual object recognition that should be considered in assembling a reliable system. For example, there are a number of different ways of selecting interest points. Some algorithms are designed to select corner points while others are designed to select blob-like features. Investigation into a number of different interest-point selection methods that are known as state-of-the-art in computer vision has led to a conclusion that the two most suitable for a mining application are the shape-adapted Harris Corners method and Maximally Stable Extremal Regions method. Further details of these can be found in "Reliable feature matching across widely separated views" (Adam Baumberg, IEEE Conference on Computer Vision and Pattern Recognition, volume 1, pp 774-781, 2000), and "Robust wide baseline stereo from maximally stable extremal regions" (J. Matas et al, British Machine Vision Conference, pp 384-393, 2002) both incorporated herein by reference as far as they are consistent with this description.

In addition, given a set of interest points 70, we must describe the image around the key point using an invariant descriptor. There is a large number of descriptors that have been proposed in the computer vision literature. The most successful descriptors are based on histograms of normalized gradient orientations with the Scale Invariant Feature Transform (SIFT) considered state-of-the-art. See "Object recognition from local scale-invariant features" (David G. Lowe, International Conference on Computer Vision, pp 1150-1157, 1999) for further detail, which is incorporated herein by reference as far as it is consistent with this description.

3. Object Tracking

The second component 130 of the VORTS 110 relates to visual object tracking. Identifying an object in images under perspective projection, with large changes in illumination and in the presence of significant image noise is difficult. As a result, it is difficult to develop a recognition system that accurately determines the type and position of all vehicles present in each frame of the video stream. In the system described herein, the tracking system 130 works alongside the recognition system 120. The visual object tracking subsystem 130 receives as input both the camera images and the output of the recognition system 120. The result is a more accurate update of the location of all detected vehicles.

Figure 3:
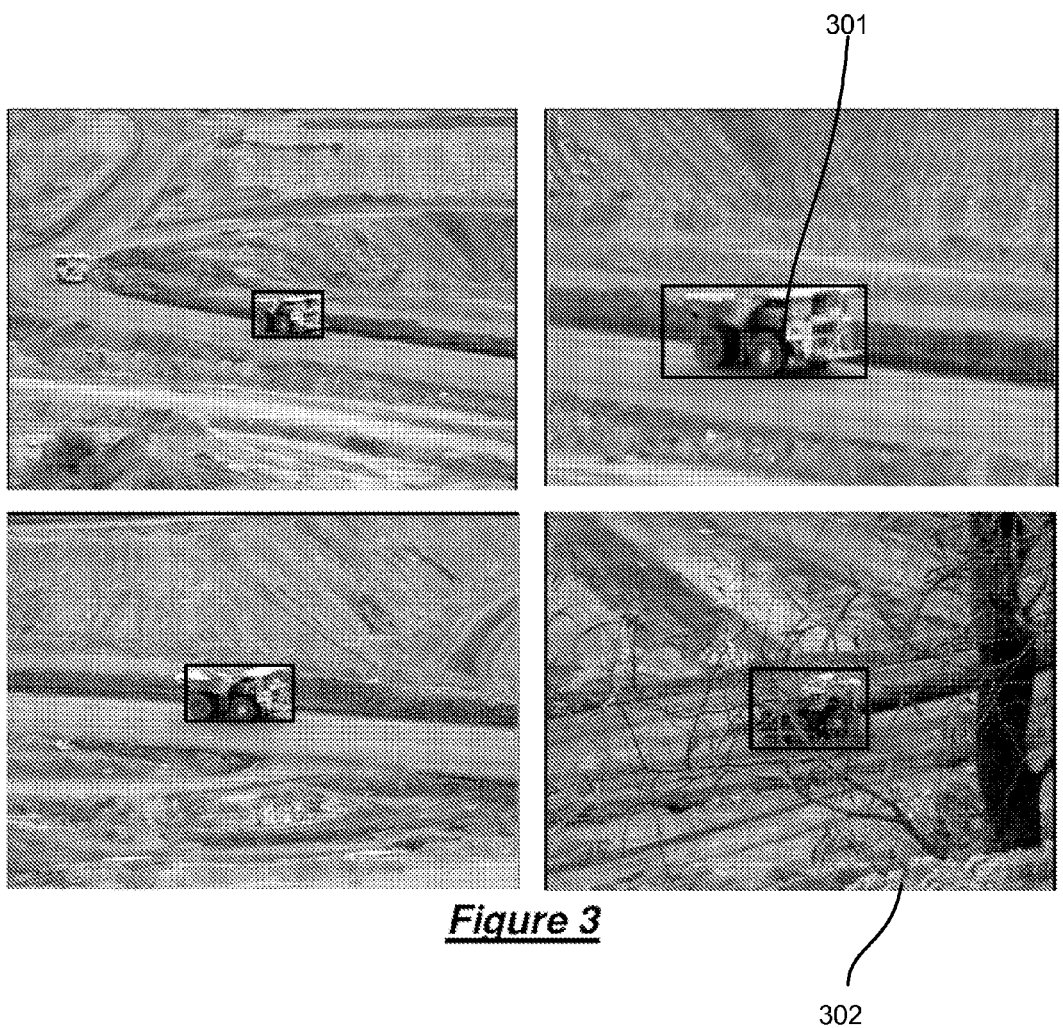
FIG. 3 is an image illustrating visual vehicle tracking.

FIG. 3 shows an example of successfully tracking a haul truck 301. For this sequence, the camera motion is not known including the zoom which as can be seen in the Figure changes considerably from one frame to another. For this example, tracking is also shown in the last frame 302 to be robust to occlusions (such as the branches of a tree).

The example shown in FIG. 3 uses edges as the main cue for the location of the vehicle. Edges are suitable for this tracking application because most edges in the images are generated by man-made objects. However, in order for the tracker to be robust in all cases, a multiple-cue tracking method is employed. A Bayesian approach can be used to combine a number of different trackers.

Using a Bayesian approach, a number of Bayesian filters focused on different object features are integrated, i.e., color or shape, in such a way that the output from one filter can be used to correct the output of the next filter in the cascade. Two example methods of Bayesian filtering are described elsewhere herein. Further details can be found in "Integration of dependent Bayesian filters for robust tracking" (Franscesc Moreno-Noguer, et al, In Proceedings of IEEE International Conference on Robotics and Automation, 2006) incorporated herein by reference.

4. Data Fusion for Localization

It is common practice in open pit mining that vehicles are localized using GPS. Accurately knowing the position and velocity of any vehicle as it goes about the mine is important for supporting automation systems such as Komatsu's Autonomous Haulage System trucks and ACFR's autonomous blasthole drilling machines. Due to the geometry of an open pit mine, however, there are several locations where GPS fails because an insufficient number of satellites are visible. One way of solving the problem of continuous vehicle localization is by using a combination of GPS and a monocular camera. As explained above, the visual object recognition and tracking system VORTS 110 can be used to detect entities in video.

This information can be used to provide continuous localization in 3D. When a vehicle's location is initially known its position can accurately be estimated by observing it from a stationary camera. Moreover, when data from two or more cameras are available, a better estimate of the vehicle's location can be obtained. This is performed by the vehicle localization module 160 shown in FIG. 1A, which receives input from the vehicle tracking module 130 and whatever vehicle GPS data is available.

There are several vehicle tracking and localization applications where the initial position of the vehicle is known by GPS or by other means. However, adequate information after initialization essential for accurate tracking is often hard to obtain. Bearing only tracking of a vehicle starting from a known initial position, and bearing only tracking of a vehicle when the GPS measurements of its location are discontinued for some reason are two methods that may be used in vehicle localization. In particular, the indirect or error form of state variables can be used in accurate bearing only tracking of a vehicle after initialization or when the GPS measurements of its location are discontinued. Moreover, the error form of the state variables of a constant velocity model of a vehicle moving in a 2D environment tracked by bearing only measurements is fully observable.

There are two steps in the filtering used for the vehicle localization: (1) prediction, and (2) correction. Prediction is performed according to a model of the system dynamics and correction according to an observation model. The model of the system dynamics described herein is a constant velocity model. If appropriate, a different model may be used for a specific application, for example a model taking into account a change in velocity from one time instant to the next.

The following two sections explain how two examples of instantiations of Bayesian filtering can be used for fusing the initial prediction with observation data (such as a video image or GPS data).

4.1 Kalman Filter

In the case that the system modelled has linear dynamics with Gaussian noise, a Kalman Filter (KF) is used because it produces an exact estimate of the posterior distribution. The prediction of the system state $x_t$ at time t−1 is given by $$x_t = F x_{t-1} + w_t$$

where x is the state vector with m elements and w is the Gaussian random variable representing the noise in the system dynamics, $N(0, Q_t)$. F is an m×m transfer matrix.

The measurement model represented by the n-dimensional vector $z_t$ at time t is given by $$z_t = H_t x_t + v_t$$

where $x_t$ is the state vector as before, $v_t$ is a Gaussian random variable representing the measurement noise $N(0, R_t)$, and H is an n×m matrix. The measured data for the implementation described herein include GPS data and/or video image data.

Given F, H, $Q_t$, and $R_t$ a Kalman filter update proceeds as follows:

1. The a priori estimate is given by $x_t^- = F x_{t-1} + w_t$.
2. The a priori estimate error covariance is given by $P_t^- = F P_{t-1} F^T + Q_{t-1}$.
3. The Kalman gain or blending factor is given by $K_t = P_t^- H_t^T (H_t P_t^- H_t^T + R_t)^{-1}$.
4. The updated state estimate is given by $K_t = P_t^{-H_t^T} (H_t P_t^- H_t^T + R_t)^{-1}$.
5. The updated state covariance is given by $P_t = (I - K_t H_t) P_t^-$, where I is the identity matrix.

The above steps are repeated at each time step to obtain an estimate of the state given by the Gaussian distribution $N(x_t, P_t)$ at time t.

4.2 Particle Filter

In the case that the posterior distribution is not uni-modal and cannot be modelled using a single Gaussian distribution, we can perform filtering using a particle filter. In what follows we describe the sampling-importance-resampling (SIR) filter.

In the case of a particle filter, the posterior distribution is represented by a set of k weighted particles $\{x_t^{(i)}, w_t^{(i)}\}_{i=1,\ldots,k}$ such that all weights sum to 1, and $x_t$ is the state vector of m dimensions as above. For the prediction step, each particle is updated according to a proposal distribution, $\pi(x_t|x_{0:t-1}, y_{0:t})$ that (in this case) is the same as the model of the system dynamics having the form $x_t = F x_{t-1} + w_t$ as above. In the simplest case the matrix F is set to the identity matrix I and so the particles are only perturbed according to the noise model $Q_t$.

The importance weights for the new set of particles are then computed according to how well they match observations, i.e., $w_t^{(i)} = p(z_t|x_t^{(i)})$. A resampling step according to these particle weights selects a set of k particles representing an estimate of the posterior distribution at the next time step. The above process repeats for each time step.

5. Method Overview

The following description presents implementation details for vehicle tracking in 2D using a GPS sensor and a single camera. This implementation can readily be extended to a 3D implementation, as well as to an implementation with more than one camera.

The vehicle's position and velocity at time t is given by the state vector:

$$x_t = [x_v, v_x, y_v, v_y]$$

where $x_v$, $y_v$ is the vehicle's 2D location and $v_x$, $v_y$ its velocity in the x and y directions respectively.

The first step in the method is to predict the vehicle's position in the next time slot. Assuming a constant velocity model, the process model is as follows:

$$F = \begin{bmatrix} 1 & \delta t & 0 & 0 \\ 0 & 1 & 0 & 0 \\ 0 & 0 & 1 & \delta t \\ 0 & 0 & 0 & 1 \end{bmatrix} \quad (i)$$

where $\delta t$ denotes the time interval between two updates. If appropriate a model taking into account a change in velocity may be used. Given F the vehicle position update can then be computed using the system state equation $$x_t = F x_{t-1} + w_t \quad (ii)$$

This initial prediction can be updated using GPS data and/or camera images.

Figure 1B:
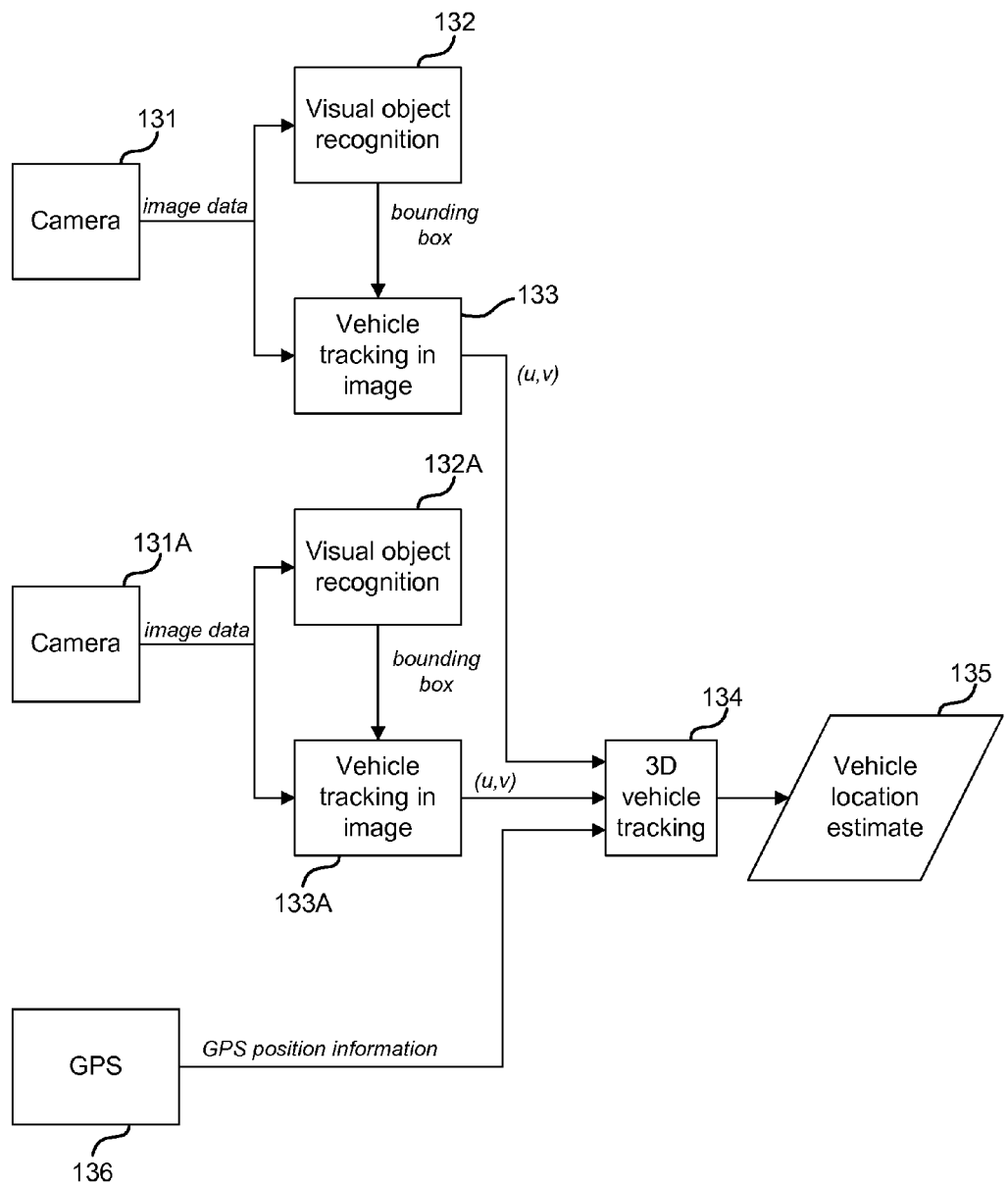
FIG. 1B is a diagram of a method for vehicle tracking.

FIG. 1B is a diagrammatic representation of data processing and data flow in the system of FIG. 1A.

During time intervals when GPS data is available from GPS 136, it is possible to use this data to refine the location estimate as described above. If the GPS measurement at time t is given by:

$$z_t^- = [x_{gps}, y_{gps}]^T$$

then the predicted measurement is given by $$z_t = H_t x_t + v_t$$

for $$H = \begin{bmatrix} 1 & 0 & 0 & 0 \\ 0 & 0 & 1 & 0 \end{bmatrix}$$

As described elsewhere herein, using this H a Kalman filter may be used to correct the initial predicted vehicle position. The vehicle position is therefore updated using the GPS data. In this instance equations 19 and 20 are applicable to the system model of equations 8 and 9.

If the vehicle is also observed by a camera, then a further correction of the estimated vehicle position can be achieved. For the case of 2D vehicle motion (used herein to simplify the explanation, but which can readily be extended for 3D vehicle motion), the vehicle position in the image plane is given as (u,v).

Observations of the vehicle are done using a combination of feature-based object recognition and particle filter tracking (as described elsewhere herein). For the particle filter, the particle weights are computed using a measure of the density of canny edge pixels within a rectangular area around the predicted vehicle location on the image plane.

Referring to FIG. 1B, image data provided by camera 131 is used for visual objection recognition 132. The output of the object recognition is a bounding box around an identified object. The image data and this bounding box are then used for vehicle tracking in the image 133. The vehicle tracking 133 provides target positions of the object in the image.

The prediction of the vehicle location is performed using equations (i) and (ii) above to generate new values at time t for the state estimate $x_t^-$ and the estimated covariance $P_t^-$, i.e. the predicted values that will be corrected using the new measurement.

The new measurement from image tracking (still assuming 2D vehicle motion) is given by:

$$z_t^- = v_t$$

The predicted measurement in this example according to the camera model (described elsewhere herein) and the predicted vehicle location $x_t^-$ is:

$$v = f_y \tan\left(\tan^{-1}\frac{y_v - y_c}{x_v - x_c} - \alpha\right) + v_0$$

where $(x_v, y_v)$ is the predicted 2D vehicle position, $(x_c, y_c)$ the camera location, and $v_0$ the image centre column from the camera calibration matrix.

For computing the Kalman gain (in order to fuse the data) the matrix H is required. For a single camera model this is given by:

$$H = [h_1 \, 0 \, h_2 \, 0]$$

where $h_1$ and $h_2$ are given by $$h_1 = \frac{f_y(y_v - y_c)\sec^2\theta_v}{r_c^2}$$

$$h_2 = \frac{f_y(x_v - x_c)\sec^2\theta_v}{r_c^2}$$

and $$r_c^2 = (y_v - y_c)^2 + (x_v - x_c)^2$$

$$\theta_v \tan^{-1}\left(\frac{y_v - y_c}{x_v - x_c} - \alpha\right)$$

Referring again to FIG. 1B, if the system has two cameras (and not just one), then visual data from a second camera 131A is provided for visual object recognition 132A and vehicle tracking 133A as for the first camera 131. The same holds for more than two cameras.

Where two cameras are used, the following equations for H are used, as described in further detail elsewhere herein:

$$h(x_t) = \begin{bmatrix} f_y \tan\left(\tan^{-1}\left(\frac{y_v - y_c}{x_v - x_c}\right) - \alpha\right) + v_0 \\ f_y' \tan\left(\tan^{-1}\left(\frac{y_v - y_c'}{x_v - x_c'}\right) - \alpha'\right) + v_0' \end{bmatrix} \quad (54)$$

$$H = \begin{bmatrix} h_1 & 0 & h_2 & 0 \\ h_3 & 0 & h_4 & 0 \end{bmatrix} \quad (55)$$

The visual object recognition 132, 132A is performed as described above with reference to module 120. The vehicle tracking 133, 133A is performed using image-based multi-cue vehicle tracking as described above. The vehicle tracking 133, 133A output (target positions in the image) is then used for vehicle tracking 134 using a filtering technique such as a Particle Filter or Kalman Filter as described above. At step 134 measurement data (from video images or GPS data) is fused with the initial prediction based on the relevant velocity model for the vehicle under observation.

Other camera models may used depending on the specific system configuration.

6. Observability Analysis and Camera Calibration

6.1. Piece-Wise Constant Systems Theory

A system is said to be observable at time $t_0$ if its state vector at time $t_0$, $x(t_0)$ can be determined from the measurements in $t_f$, $t_0 < t_f$ which is finite. Several linear and nonlinear techniques are used in observability analysis of engineering systems. The piece-wise constant systems theory in particular assumes that the systems are piece-wise constant over sufficiently small time segments and uses linear systems theory in the observability analysis. The use of linear systems theory in piece-wise constant systems theory provides advantages such as the possibility of using simple linear state space analysis techniques to access all state variables and simplified observer design.

A summary of the piece-wise constant systems theory for continuous time systems is outlined below. Let a system be defined as follows, $$\dot{x}(t) = F \times x(t) \quad (1)$$

$$z(t) = H \times x(t) \quad (2)$$

where $x(t) \in \square^n$ represents the state variables being modelled and $z(t) \in \square^m$ represents the measurements from the system, F and H are the process and measurement model transition matrices respectively. Then the observability matrix $O_j$ of the system in time segment j is defined as $$z_j(t_j) = O_j x(t_1) \quad (3)$$

where $z_j(t_j)$ is the concatenated vector consisting of the vector $z(t_j)$ and its (n−1) derivatives, $t_1$ is the initial time segment and $$O_j = [(H_j)^T (H_j F_j)^T \ldots (H_j(F_j)^{n-1})^T]^T \quad (4)$$

where $F_j$ and $H_j$ are the process and measurement model transition matrices in time j. Total observability matrix O(r) for r time segments is then defined as follows.

$$Z(r) = O(r) x(t_1) \quad (5)$$

where $$O(r) = \begin{bmatrix} O_1 \\ O_2 e^{F_1 \Delta_1} \\ O_3 e^{F_2 \Delta_2} e^{F_1 \Delta_1} \\ \ldots \\ O_r e^{F_{r-1} \Delta_{r-1}} e^{F_{r-2} \Delta_{r-2}} \ldots e^{F_1 \Delta_1} \end{bmatrix} \quad (6)$$

and $$Z(r) = [z_1^T \, z_2^T \, z_3^T \, \ldots \, z_r^T]^T \quad (7)$$

Here, $e^{F_j D_j}$ terms in O(r) account for the transition of the state variables $x(t_j)$ to that of the initial time segment ($x(t_1)$). The piece-wise constant systems theory states that if and only if the rank of O(r) at any segment r is equal to the dimension of the state vector $x(t)$ then the system is fully observable. This follows directly from the fact that the rank of O(r) determines the existence of a unique solution for $x(t_1)$ in equation (5) and from the definition of the observability. We can use the simplified observability matrix $O_s(r) = [O_1^T \ldots O_r^T]^T$ in the observability analysis if $\text{Null}(O_j) \cup \text{Null}(F_j)$ for all $1 \le j \le r$.

6.2 2D Vehicle Tracking and Localization Problem in Indirect Form

The problem of vehicle tracking and localization where the vehicle motion is not represented by a vehicle kinematic model can be formulated as follows:

$$\dot{x}(t) = f(x(t)) + \eta_1(t) \quad (8)$$

$$z(t) = h(x(t)) + \eta_2(t) \quad (9)$$

where $\eta_1(t)$ and $\eta_2(t)$ are uncorrelated zero mean process and measurement noise terms with covariance Q(t) and R(t) respectively, $f(\bullet)$ is the process model and $h(\bullet)$ is the measurement model. The state vector $x(t) = [x_v \, v_x \, y_v \, v_y]^T$ where $x_v$, $y_v$, $v_x$ and $v_y$ are x coordinate, y coordinate, velocity in x axis direction and velocity in y axis direction respectively.

The indirect or error form of the vehicle tracking and localization problem excluding the noise terms from the equations for simplicity is as follows.

$$\delta \dot{x}(t) = F \delta x(t) \quad (10)$$

$$\delta z(t) = H \delta x(t) \quad (11)$$

where δx(t) and δz(t) are the error between the true value and the estimated value of the state variables and the measurements respectively. The other terms of (10) and (11) are, $$\delta x(t) = [\delta x_v \ \delta v_x \ \delta y_v \ \delta v_y]^T \quad (12)$$

$$F = \frac{\partial f}{\partial x} \quad (13)$$

$$H = \frac{\partial h}{\partial x} \quad (14)$$

$$\delta x(t) = x_{true}(t) - \hat{x}(t) \quad (15)$$

where $x_{true}(t)$ is the true value of x(t) and $\hat{x}(t)$ is the predicted value of x(t). x(t) is usually calculated from the estimated value, odometry or initialized value where appropriate. Hence, during a certain interval if you know the value of $\hat{x}(t)$ the estimated value of x(t) is the sum of $\hat{x}(t)$ and the estimated value of δx(t). In the following discussion we show that δx(t) is fully observable in the bearing only vehicle tracking and localization problem if we use GPS for the initial estimation and subsequent estimated value of x(t) in determining $\hat{x}(t)$+ δx(t).

6.3 Observability Analysis

We use a constant velocity model to represent the vehicle kinematic model. When the direct form of the 2D vehicle tracking and localization problem is considered it is fully observable when the GPS measurements of the vehicle locations are available. Since, $$f(x(t)) = \begin{bmatrix} 0 & 1 & 0 & 0 \\ 0 & 0 & 0 & 0 \\ 0 & 0 & 0 & 1 \\ 0 & 0 & 0 & 0 \end{bmatrix} \quad (16)$$

$$h(x(t)) = \begin{bmatrix} 1 & 0 & 0 & 0 \\ 0 & 0 & 1 & 0 \end{bmatrix} \quad (17)$$

$$O = [(H)^T \ (HF)^T \ (HF^2)^T \ (HF^3)^T]^T \quad (18)$$

and O is full rank.

Consider now the indirect representation of the 2D vehicle tracking and localization algorithm $$F = \begin{bmatrix} 0 & 1 & 0 & 0 \\ 0 & 0 & 0 & 0 \\ 0 & 0 & 0 & 1 \\ 0 & 0 & 0 & 0 \end{bmatrix} \quad (19)$$

When the GPS fix of the vehicle location is available. H is given by, $$H = \begin{bmatrix} 1 & 0 & 0 & 0 \\ 0 & 0 & 1 & 0 \end{bmatrix} \quad (20)$$

Hence the observability matrix in the first time segment $$O_1 = [(H)^T (HF)^T (HF^2)^T (HF^3)^T]^T \quad (21)$$

has a rank of 4. Hence, the system (16)-(17) of error states is observable.

6.4 2D Vehicle Tracking and Localization Using a Monocular Camera

Figure 4:
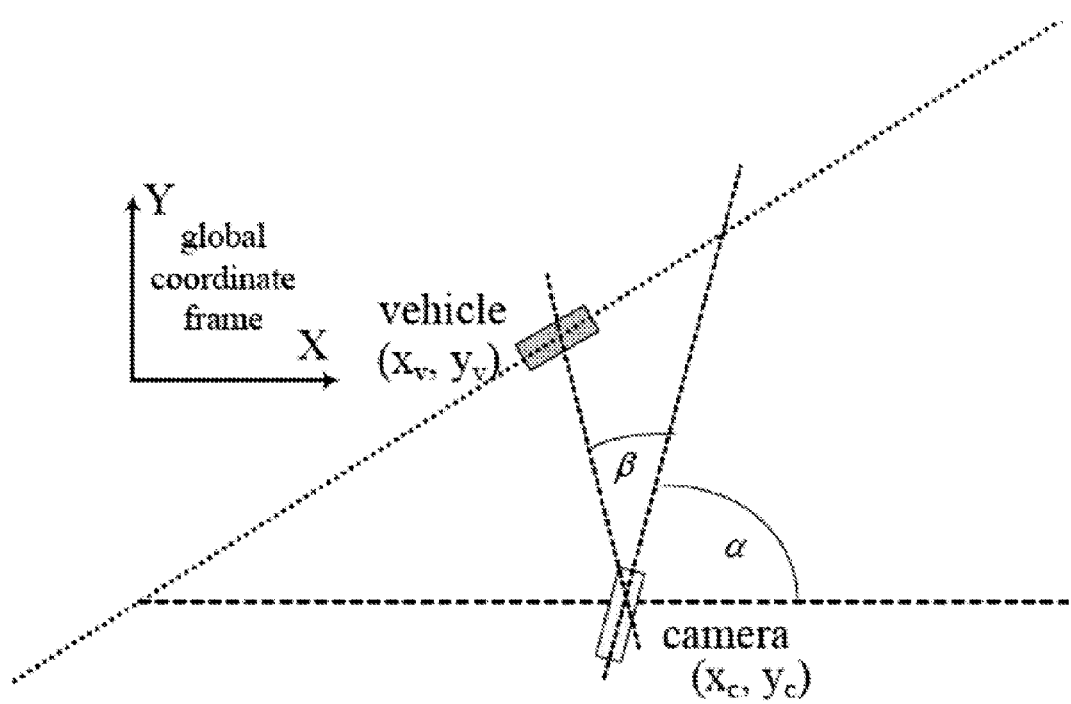
FIG. 4 is a diagram showing a relationship between camera and vehicle locations.

Let there be a vehicle moving on a 2D horizontal plane as shown in FIG. 4 with $x_v$ and $y_v$ as lateral and longitudinal coordinates with respect to a global coordinate frame. The velocities of the vehicle in lateral and longitudinal directions are $v_x$ and $v_y$. Let the camera optical centre be at a point given by lateral and longitudinal coordinates $x_c$ and $y_c$ and α be the angle of the camera optical axis with the lateral direction, all with respect to the selected global coordinate frame. It is assumed that the camera optical axis is parallel to the ground plane.

6.5 Camera Calibration

The one or more cameras that are used need to be calibrated at least once. However, calibration can also be done from time to time, for example once a month or once a day.

Figure 5:
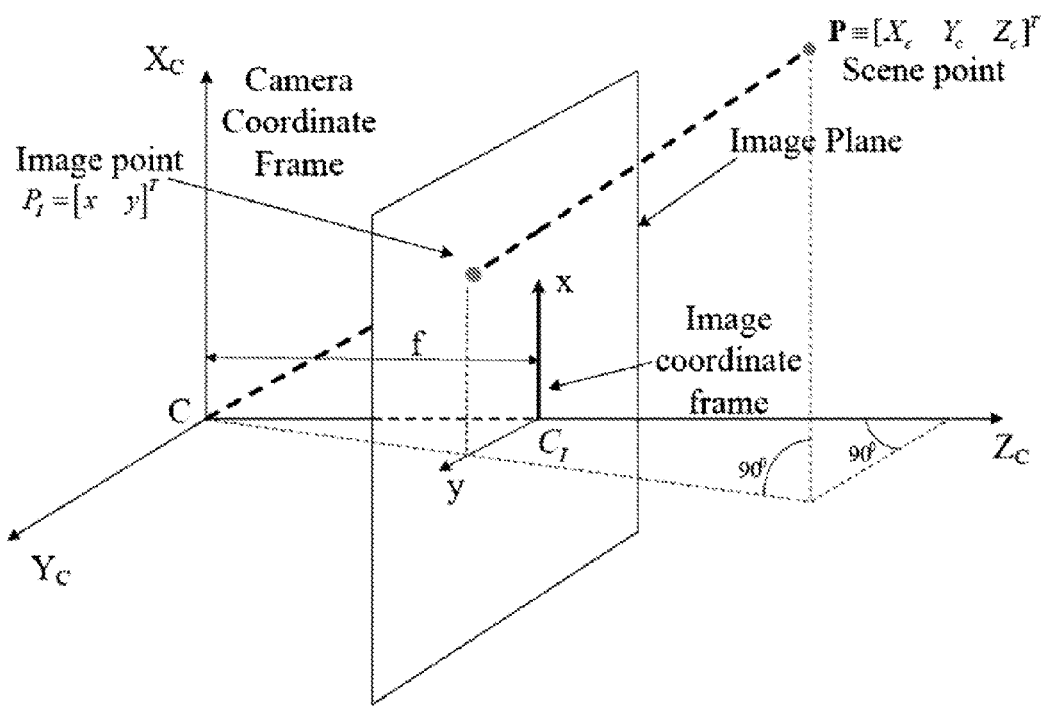
FIG. 5 is a diagram showing reference frame relationships for camera calibration.

The pinhole model of the camera with perspective projection is used in the camera calibration and modelling. Further details of the method utilized for camera calibration can be found in "Flexible camera calibration by viewing a plane from unknown orientations" (Z. Zhang, International Conference on Computer Vision, pp 666-673, 1999), and "A flexible new technique for camera calibration" (Z. Zhang, IEEE Transactions on Pattern Analysis and Machine Intelligence, 22(11):1330-1334, 2000), both incorporated herein by reference. This approach requires a camera to observe a planar pattern shown at a few different orientations. Either the camera or the fixed pattern can be moved in making observations. This method provides the calibration parameters as a closed form solution. Let a scene point $P=[X_C \ Y_C \ Z_C]^T$ be in camera coordinate frame with the focal point C as the origin and camera optical axis as the Z axis where $X_C, Y_C$ and $Z_C$ denote the coordinates of the scene point in the camera coordinate frame. The principal point (image centre) $C_1$ is the origin of the image plane which is parallel to the $X_C$, C and $Y_C$ plane. Let $P_1=[x \ y]^T$ be the image of the point P in the image plane as shown in the FIG. 5 where x and y are its X and Y coordinates with reference to the image coordinate frame. Let $[u_0 \ v_0]^T$ be the coordinates of the image center or the principal point on the pixel frame, let $[u \ v]^T$ be the pixel coordinates of the point P in pixel coordinate frame (with u and v corresponding to x and y coordinates in the image coordinate frame), and let $S_x$ and $S_y$ be the effective sizes of a pixel in the horizontal and vertical directions respectively. The following expression can then be derived for the homogeneous (projective) coordinates of the scene point and the corresponding pixel point.

$$\begin{bmatrix} u \\ v \\ 1 \end{bmatrix} = \begin{bmatrix} \frac{f}{S_x} & 0 & u_0 & 0 \\ 0 & \frac{f}{S_y} & v_0 & 0 \\ 0 & 0 & 1 & 0 \end{bmatrix} [X_C \ Y_C \ Z_C \ 1] \quad (22)$$

We now denote $$f_x = \frac{f}{S_x} \text{ and } f_y = \frac{f}{S_y}$$

with both the quantities having the unit of pixels, where f is the camera focal length. The 3×4 matrix at the right hand side of equation (22) is known as the Camera Calibration Matrix.

6.8 Monocular Camera Measurement Model

Figure 6:
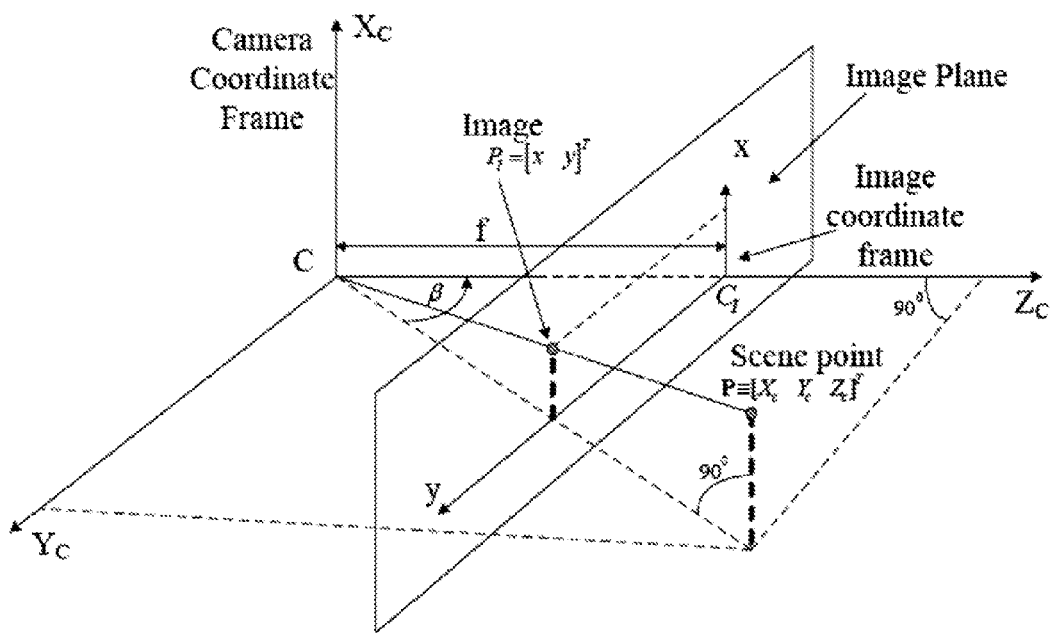
FIG. 6 is a diagram illustrating bearing measurement calculations.

Let the camera coordinate frame and the world coordinate frame be perfectly aligned so that there is no rotation between the camera and the world coordinate frames. Using the camera calibration matrix (22) and FIG. 6 it follows that, $$\tan\beta = \frac{Y_C}{Z_C} = \frac{y}{f}. \tag{23}$$

But, $$\frac{y}{f} = \frac{(v-v_0)S_y}{f} = \frac{(v-v_0)}{f/S_y} = \frac{(v-v_0)}{f_y}. \tag{24... }$$

Hence, it follows that, $$\tan\beta = \frac{(v-v_o)}{f_y} \tag{24}$$

From FIG. 4 it follows that, $$\alpha + \beta = \tan^{-1}\left(\frac{(y_v - y_c)}{(x_v - x_c)}\right) \tag{25}$$

Hence, $$\tan\beta = \tan\left(\tan^{-1}\left(\frac{y_v - y_c}{x_v - x_c}\right) - \alpha\right) \tag{26}$$

$$\frac{(v-v_0)}{f_y} = \tan\left(\tan^{-1}\left(\frac{y_v - y_c}{x_v - x_c}\right) - \alpha\right) \tag{27}$$

Therefore, the monocular camera measurement model is:

$$v = f_y \tan\left(\tan^{-1}\left(\frac{y_v - y_c}{x_v - x_c}\right) - \alpha\right) + v_0 \tag{28}$$

6.9 Observability Analysis

Consider now the case where GPS measurements of the vehicle location are not available and the vehicle is observed by a single monocular camera located at coordinates $(x_c, y_c)$. Using equations (9) and (28), the monocular camera model can be expressed as:

$$h(x_t) = f_y \tan\left(\tan^{-1}\left(\frac{y_v - y_c}{x_v - x_c}\right) - \alpha\right) + v_0 \tag{29}$$

With H defined as follows:

$$H = [h_1 0 h_2 0] \tag{30}$$

where $$h_1 = f_y(y_v - y_c)\sec^2\theta_v / r_c^2 \tag{31}$$

$$h_2 = f_y(x_v - x_c)\sec^2\theta_v / r_c^2 \tag{32}$$

$$r_c^2 = (y_v - y_c)^2 + (x_v - x_c)^2 \tag{33}$$

$$\theta_v = \tan^{-1}\left(\frac{(y_v - y_c)}{x_v - x_c} - \alpha\right) \tag{34}$$

The observability matrix of the first time segment from equation (21) using $F_1=F$ and using H from equation (30) is:

$$O_1 = \begin{bmatrix} o_1 & 0 & o_2 & 0 \\ 0 & o_1 & 0 & o_2 \\ 0 & 0 & 0 & 0 \end{bmatrix} \tag{35}$$

$$o_1 = f_y(y_{v,1} - y_c)\sec^2\theta_{v,1} / r_{c,1}^2 \tag{36}$$

$$o_2 = f_y(x_{v,1} - x_c)\sec^2\theta_{v,1} / r_{c,1}^2 \tag{37}$$

$x_{v,i}$, $x_{v,i}$, and $y_{c,i}$ represent the vehicle and camera x and y coordinates in the i-th time segment respectively, and $$r_{c,i}^2 = (y_{v,i} - y_c)^2 + (x_{v,i} - x_c)^2 \tag{38}$$

$$\theta_{v,i} = \tan^{-1}\left(\frac{(y_{v,i} - y_c)}{x_{v,i} - x_c}\right) - \alpha \tag{39}$$

It can be seen from this that the rank of observability matrix $O_1$ is 2. Hence, the system of error states is not observable in the first time segment. It now follows that we can transform equation (5) into the following form:

$$T_r Z(r) = T_r O(r) M_r M_r^{-1} x(t_1) \tag{40}$$

where $T_r$ and $M_r$ represent the matrix transformations on $O(r)$. We now transform $T_r O(r) M_r$ into the following form, $$U_r = T_r O(r) M_r = \begin{bmatrix} I_R & P_R \\ 0 & 0 \end{bmatrix} \tag{41}$$

where R is the rank of the $O(r)$ and $P_R$ is the matrix resulting from this transformation. Hence, $$U_R = \begin{bmatrix} 1 & 0 & \frac{x_{v,1} - x_c}{y_{v,1} - y_c} & 0 \\ 0 & 1 & 0 & 0 \\ 0 & 0 & 0 & 0 \end{bmatrix} \tag{42}$$

Let $y_O$ and $y_U$ be the observable and unobservable parts of the state space. Then, $$y_O = [I_R | P_R] M_r^{-1} x(t_1) \tag{43}$$

$$y_U = [0 | I_{n-R}] M_r^{-1} x(t_1) \tag{44}$$

where n is the dimension of the state vector. Hence, from (43) and (44) it follows that, $$y_O = \begin{bmatrix} \delta x_v + \frac{x_{v,1} - x_c}{y_{v,i} - y_c} \delta y_v \\ \delta x_y + \frac{x_{v,1} - x_c}{y_{v,i} - y_c} \delta v_y \end{bmatrix} \tag{45}$$

-continued $$y_U = \begin{bmatrix} \delta y_v \\ \delta v_y \end{bmatrix} \quad (46)$$

It follows from (35) that the observability matrix $O_1$ of the 1st segment is also rank deficient by 2. Let the null vectors of the observability matrix $O_1$ of the 1st segment be denoted by $n_{1,1}$ and $n_{1,2}$ $$n_{1,1} = \left[\left(\frac{x_{v,1} - x_c}{y_{v,1} - y_c}\right) \; 0 \; 1 \; 0\right]^T \quad (47)$$

$$n_{1,2} = \left[0 \; \left(\frac{x_{v,1} - x_c}{y_{v,1} - y_c}\right) \; 0 \; 1\right]^T \quad (48)$$

However, since $F_1 n_{1,2} \neq 0$, $\text{Null}(O_j) \not\subset \text{Null}(F_j)$ for all j such that $1 \leq j \leq r$. Hence, we cannot use the simplified observability matrix in the segment wise observability analysis. Consider, now the Total Observability Matrix of the segments one and two.

$$O(2) = \begin{bmatrix} O_1 \\ O_2 e^{F_1 \Delta_t} \end{bmatrix} \quad (49)$$

$$O(2) = \begin{bmatrix} o_1 & 0 & o_2 & 0 \\ 0 & o_1 & 0 & o_2 \\ \bar{o}_1 & \bar{o}_2 & \bar{o}_1 & \bar{o}_3 \\ \bar{o}_1 & \bar{o}_1 & \bar{o}_1 & \bar{o}_1 \\ 0 & 0 & 0 & 0 \end{bmatrix} \quad (50)$$

$$\bar{o}_1 = \left(f_y \sec^2 \frac{\theta_{v,2}}{r_{c,2}^2}\right)((x_{v,2} - x_c) - (y_{v,2} - y_c)) \quad (51)$$

$$\bar{o}_2 = \left(f_y \sec^2 \frac{\theta_{v,2}}{r_{c,2}^2}\right)((x_{v,2} - x_c) - (y_{v,2} - y_c)e^{\Delta_t}) \quad (52)$$

$$\bar{o}_3 = \left(f_y \sec^2 \frac{\theta_{v,2}}{r_{c,2}^2}\right)((x_{v,2} - x_c)e^{\Delta_t} - (y_{v,2} - y_c)) \quad (53)$$

It now follows that rank of $O(2)$ is equal to 4. Therefore, the vehicle tracking using a single monocular camera is observable in two time segments.

6.10 When the Vehicle is Observed by Two Cameras

In the case where GPS measurements of the vehicle location are not available and the vehicle is observed by two cameras located at coordinates $(x_c, y_c)$ and $(x'_c, y'_c)$, then $$h(x_t) = \begin{bmatrix} f_y \tan\left(\tan^{-1}\left(\frac{y_v - y_c}{x_v - x_c}\right) - \alpha\right) + v_0 \\ f'_y \tan\left(\tan^{-1}\left(\frac{y_v - y'_c}{x_v - x'_c}\right) - \alpha'\right) + v'_0 \end{bmatrix} \quad (54)$$

where $\alpha$ and $\alpha'$ are the angles the camera optical axes make with the x-axis, $f_y$ and $f'_y$ are the camera focal lengths in the y-axis of the camera image planes and $v_0$ and $v'_0$ are the camera pixel plane parameters. It then follows that $$H = \begin{bmatrix} h_1 & 0 & h_2 & 0 \\ h_3 & 0 & h_4 & 0 \end{bmatrix} \quad (55)$$

$$h_1 = f_y(y_v - y_c)\sec^2\theta_v / r_c^2 \quad (56)$$

$$h_2 = f_y(x_v - x_c)\sec^2\theta_v / r_c^2 \quad (57)$$

$$h_3 = f'_y(y_v - y'_c)\sec^2\theta'_v / (r'_c)^2 \quad (58)$$

$$h_4 = f'_y(x_v - x'_c)\sec^2\theta'_v / (r'_c)^2 \quad (59)$$

$$r_c^2 = (y_v - y_c)^2 + (x_v - x_c)^2 \quad (60)$$

$$(r'_c)^2 = (y_v - y'_c)^2 + (x_v - x'_c)^2 \quad (61)$$

$$\theta_v = \tan^{-1}\left(\frac{(y_v - y_c)}{x_v - x_c} - \alpha\right) \quad (62)$$

$$\theta'_v = \tan^{-1}\left(\frac{(y_v - y'_c)}{x_v - x'_c} - \alpha'\right) \quad (63)$$

The observability matrix of the first time segment $O_1$ is, $$O_1 = \begin{bmatrix} o_1 & 0 & o_2 & 0 \\ o_3 & 0 & o_4 & 0 \\ 0 & o_1 & 0 & o_2 \\ 0 & o_3 & 0 & o_4 \\ 0 & 0 & 0 & 0 \end{bmatrix} \quad (64)$$

$$o_1 = f_y(y_{v,1} - y_c)\sec^2\theta_{v,1} / r_{c,1}^2 \quad (65)$$

$$o_2 = f_y(x_{v,1} - x_c)\sec^2\theta_{v,1} / r_{c,1}^2 \quad (66)$$

$$o_3 = f'_y(y_{v,1} - y'_c)\sec^2\theta'_{v,1} / (r'_{c,1})^2 \quad (67)$$

$$o_4 = f'_y(x_{v,1} - x'_c)\sec^2\theta'_{v,1} / (r'_{c,1})^2 \quad (68)$$

where $x_{v,i}$, $y_{v,i}$, $x_{c,i}$, $y_{c,i}$, $x'_{c,i}$ and $y'_{c,i}$ represent the vehicle, camera 1 and camera 2 x and y coordinates in the i-th time segment respectively and $$r_{c,i}^2 = (y_{v,i} - y_c)^2 + (x_{v,i} - x_c)^2 \quad (69)$$

$$(r'_{c,i})^2 = (y_{v,i} - y'_c)^2 + (x_{v,i} - x'_c)^2 \quad (70)$$

$$\theta_{v,i} = \tan^{-1}\left(\frac{(y_{v,i} - y_c)}{x_{v,i} - x_c}\right) - \alpha \quad (71)$$

$$\theta'_{v,i} = \tan^{-1}\left(\frac{(y_{v,i} - y'_c)}{x_{v,i} - x'_c}\right) - \alpha' \quad (72)$$

Since, $O_1$ has the rank of 4 (which is the dimension of the state vector) and hence the system is observable. However, when the two cameras and the vehicle are in a straight line, $$\frac{(y_{v,1} - y_c)}{(x_{v,1} - x_c)} = \frac{(y_{v,1} - y'_c)}{(x_{v,1} - x'_c)} \quad (73)$$

then the rank of the matrix $O_1$ becomes 2. Hence, the system becomes not observable at the first time segment. Furthermore, it follows that in any time segment if the two cameras and the vehicle are in a straight line the system (12)-(15) with error states is not observable at that segment.

7. Simulations and Experiments

A two dimensional environment of 200×300 square meters is used for the simulations. A vehicle is moving at constant velocities of 2 ms$^{-1}$ and 3 ms$^{-1}$ in longitudinal and lateral directions respectively subject to small acceleration perturbations. A wide field of view camera pointing perpendicular to the vehicle path is located at coordinates (0, 300). Bearing measurements of the vehicle by the camera and the GPS measurements of the vehicle obtained at a GPS sensor on board the vehicle are communicated to a central location for processing. Using the information available at the central location the constant velocity model of equation (16) is used to model vehicle motion and measurements from GPS and camera to localize the vehicle using indirect filtering with EKE. In the simulations zero mean Gaussian errors of Standard Deviation (STD) is used, and the GPS sensor has a 3 m error in both longitudinal and lateral directions and a bearing error of 1° for the camera is used.

Figure 7:
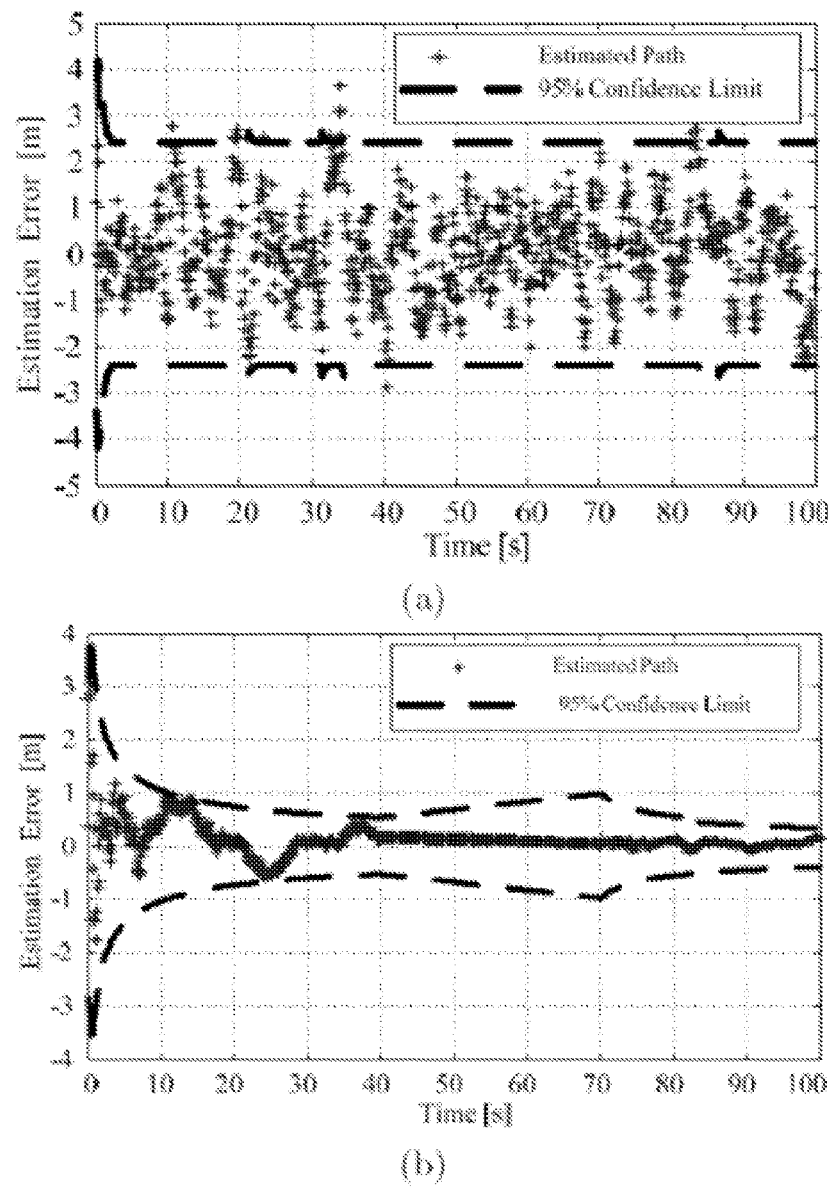
FIG. 7 illustrates graphs of filtering errors in simulations using (a) GPS only, and (b) GPS and camera with GPS outage for a period of time.

FIG. 7(a) shows the localization error (shown by stars) of the vehicle in a longitudinal direction with 95% confidence limits of the estimated uncertainty (shown by thick dashed lines) when only GPS is used in vehicle localization. FIG. 7(b) shows the localization error (shown by stars) in the longitudinal direction and 95% confidence limits of the estimated uncertainty (shown by thick dashed lines) when both GPS and camera measurements (bearing) are used in vehicle localization. In this scenario we also assume that GPS measurements of the vehicle location are not available from 40 s to 70 s. FIG. 7(b) shows that when the GPS is used in initialization the localization estimation of vehicle is consistent even when the GPS is discontinued for 30 s. The fact that vehicle location estimation is consistent even when the GPS outages occur, verifies the observability theory. For consistent localization of a vehicle, it should follow the constant velocity model closely when the GPS outages occur. If the vehicle deviates significantly from the used motion model, a second camera may improve the localization.

Figure 8:
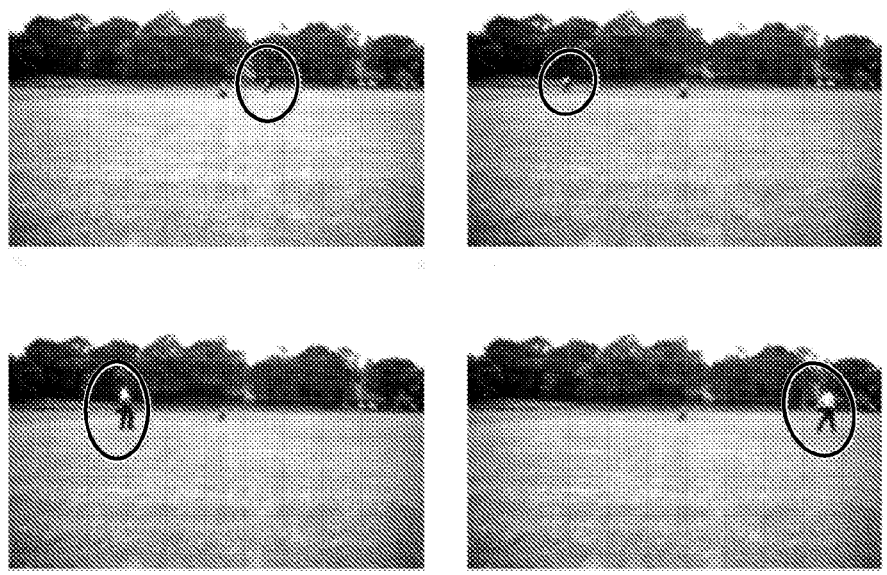
FIG. 8 shows examples of visual tracking using a particle filter with 100 particles.
Figure 9:
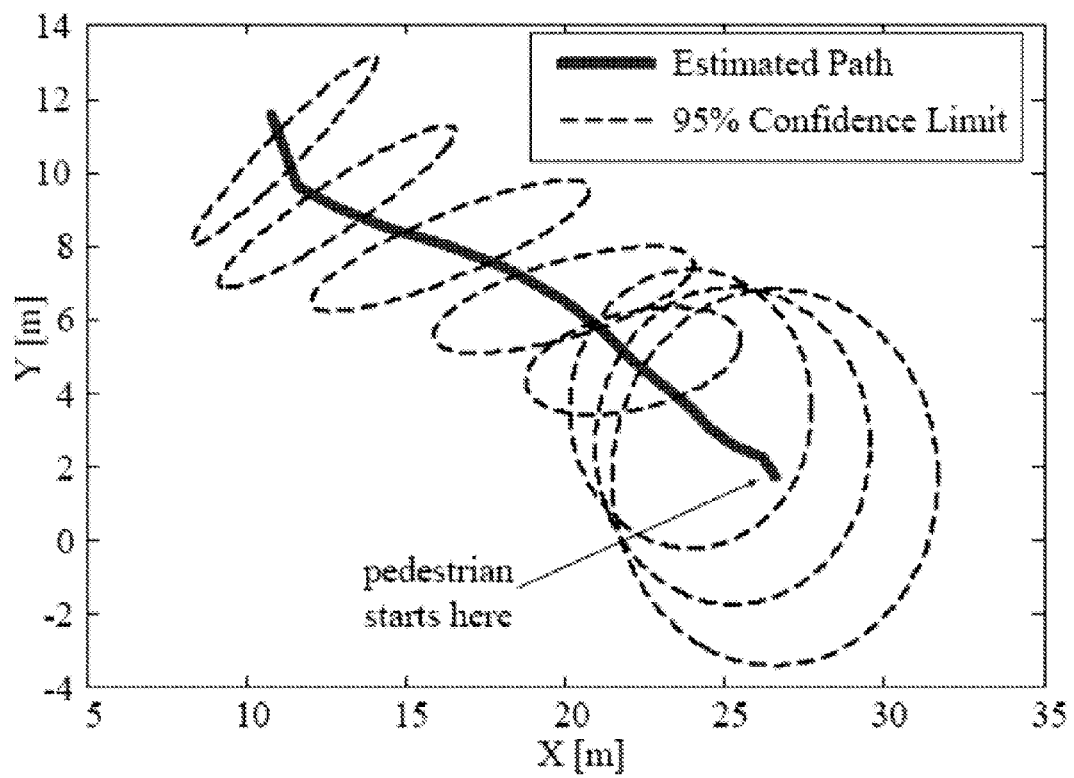
FIG. 9 is a graph showing experimental tracking results of pedestrian localization for an approximately straight line path.

The observability theory is further verified using several pedestrian tracking experiments. FIG. 8 shows examples of visually tracking a pedestrian from a fixed monocular camera. A Grass Hopper Gras20S4C-C camera manufactured by Point Gray Research is used for the experiment. The camera is located at (−8,0) pointing perpendicular to the vehicle path. The pedestrian is carrying a GPS sensor and we assume that both the camera and the GPS measurements as appropriate are available for pedestrian localization. The GPS sensor has a longitudinal and lateral errors of approximately 3 m. Visual tracking of a pedestrian is performed by filtering using a Particle Filter with 100 particles using edge density within a fixed area rectangle for computing the particle weights. A Gaussian distribution is fitted using the particle estimates and FIG. 8 shows the mean and 2σ covariance ellipse of the distribution. Using this particle filter based visual tracking method the bearing of the pedestrian is estimated with respect to the camera for pedestrian localization. FIG. 9 shows estimated path and the 95% confidence limits of estimated uncertainty of tracking a pedestrian moving along a path approximately resembling a straight line. It is assumed that as the pedestrian moves half of his trajectory a GPS outage occurs until he stops at the end of his path. Diminishing area of uncertainty elipssi representing the 95% confidence bounds of the location estimates along the estimated pedestrian's path in FIG. 9 clearly show that even when the GPS is not available, the pedestrian localization is consistent verifying the observability theory of localization described hereinabove.

Figure 10:
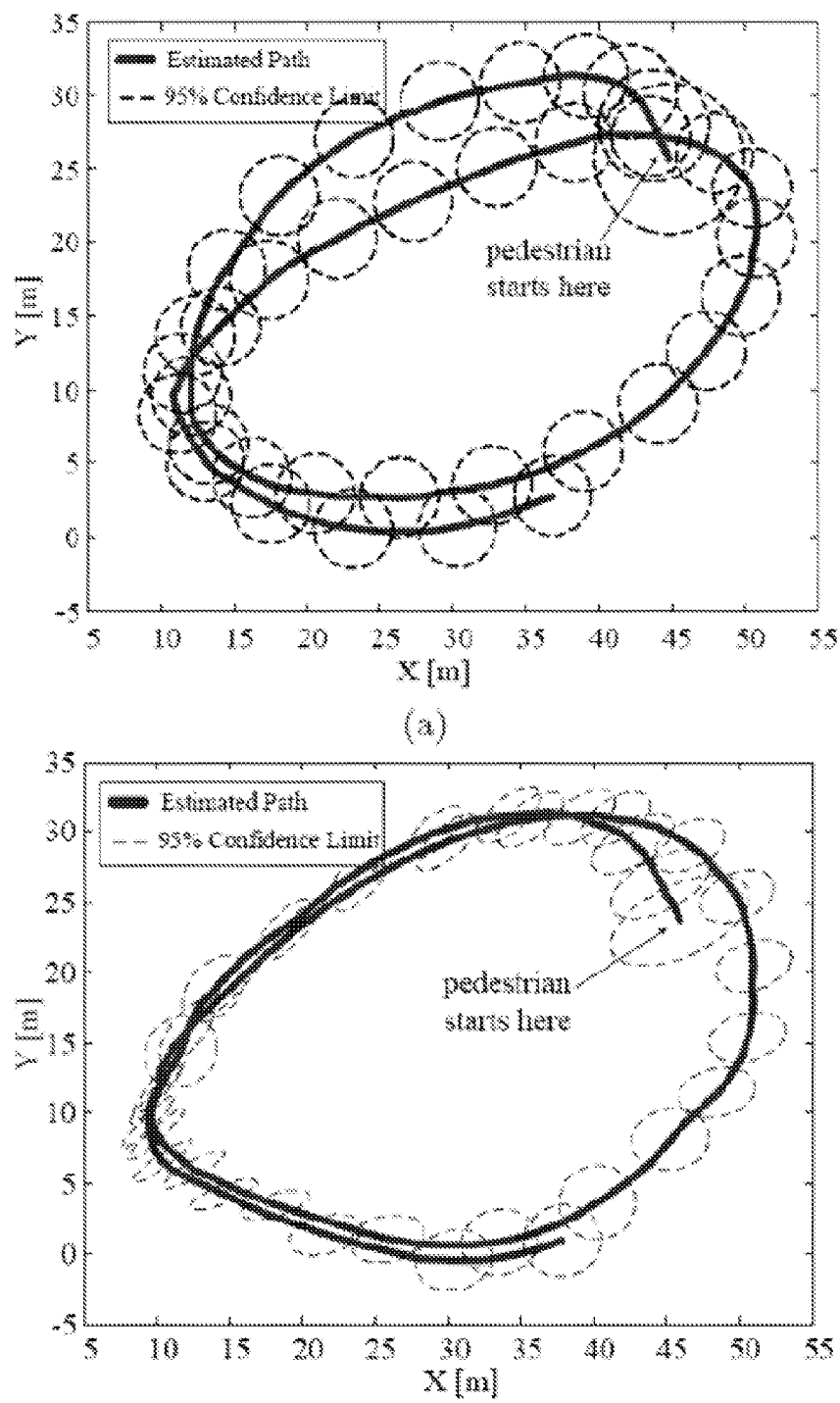
FIG. 10 shows experimental tracking results fusing GPS and camera data for a pedestrian walking in an approximately circular path.
Figure 11:
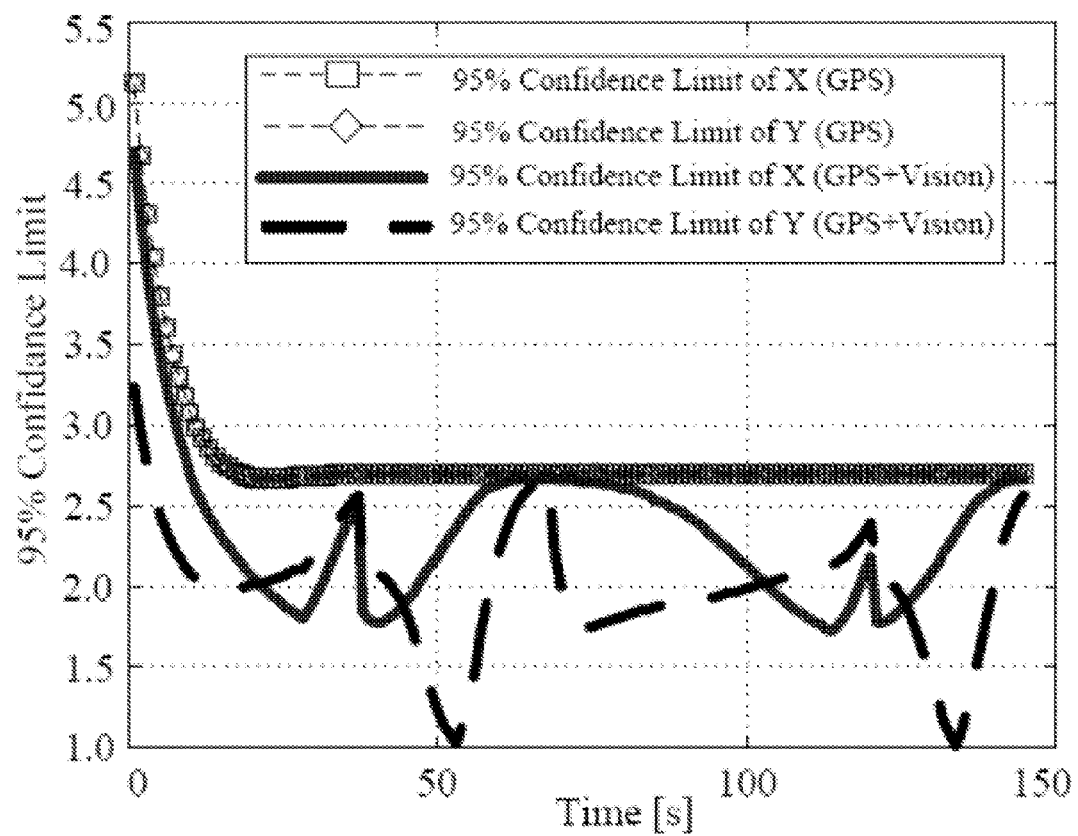
FIG. 11 illustrates the confidence of experimental tracking results fusing GPS and camera data.

FIGS. 10(a) and (b) show the same experimental setup with the fixed camera but the pedestrian moving along approximately circular path of 15 m diameter in anticlockwise direction. The camera is pointing towards the centre of the pedestrian's path in this case. FIG. 10(a) shows the estimated pedestrian's path (thick line) and uncertainty estimates (dashed lines) when GPS only is used for pedestrian localization. FIG. 10(b) shows the same experiment when both the GPS and the camera measurements are used for pedestrian localization. FIG. 11 compares the estimated uncertainties of the localization estimation. FIG. 11 clearly shows that the fusion of monocular camera information and GPS improves the uncertainty bound of pedestrian's localization estimation. It is also important to note that the pedestrian's path estimation given in FIG. 10(b) (i.e. with GPS and camera information) more accurately reflect the true path taken by the pedestrian.

In this document is described the design and implementation of an open pit vision system for remote mine monitoring. The system takes as input the raw video stream from a small number of remote-controlled, CCTV cameras overlooking the pit and then processes it to determine the location of one or more vehicles in the mine. The current state of development has been described for a machine vision system capable of unsupervised, real-time, recognition and tracking of mine entities. We have also described how the latter information can be used to complement GPS data in order to provide accurate and continuous localization for mining vehicles.

The indirect or error form can be used in vehicle tracking and localization when the GPS is available and also when GPS is discontinued after some time using a bearing only information available from a single fixed monocular camera. Using the piece-wise constant systems theory of observability analysis simulations and experiments show that when the GPS is discontinued after some time and a vehicle is observed by a fixed monocular camera whose location is known with a certain accuracy, the error states of the two dimensional point target tracking of the vehicle is fully observable if the vehicle is observed in two consecutive time segments. This is clearly advantageous in several open pit mining applications where vehicle location estimation with GPS can be significantly improved with the aid of multiple cameras located over their path sending measurements to a central location or a control centre for processing. Such a setup has definite advantages when the GPS measurements from vehicles are discontinued due to periodic GPS signal blockage as a result of multi-path effects of local terrain, foliage and places having restricted view of the sky and due to communication breakdown between the vehicles and the central location. The vehicle localization may be made more robust to changing vehicle dynamics and maneuvers by using more than one monocular camera for open pit mining applications.

Throughout this specification, unless the context requires otherwise, the word "comprise", or variations such as "comprises" and "comprising", will be understood to imply the inclusion of a stated integer or group of integers but not the exclusion of any other integer or group of integers.

The foregoing detailed description of the present invention has been presented by way S of example only and is not intended to limit the scope of the invention which includes each and every novel feature and combination of novel features herein disclosed.

What is claimed is:

1. A method for vehicle localization in an open pit mining environment, comprising:
    receiving a sequence of picture frames from a camera calibrated in a fixed coordinate system with a field of view encompassing a region of vehicle operation in the mining environment;
    processing pixels of at least one picture frame of the sequence of picture frames to identify interest points using a vehicle recognition algorithm;

analysing the interest points to determine the presence of a vehicle in the camera field of view;

tracking an image position of the vehicle within the region of vehicle operation by analysing the sequence of picture frames using a vehicle tracking algorithm;

ascertaining at least one independent measure of the vehicle location within the region of vehicle operation relative to the fixed coordinate system; and fusing the image position of the vehicle and the at least one independent vehicle location measurement to provide an output of vehicle localization over time.

2. The method according to claim 1 wherein the independent measure of vehicle location is available intermittently and if the independent measure is unavailable the method comprises:

providing the output of vehicle localization over time dependent on the image position of the vehicle.

3. The method according to claim 1 wherein the independent measure of vehicle location is a measurement from a GPS receiver.

4. The method according to claim 1 wherein the sequence of picture frames is received from a plurality of cameras calibrated in the fixed coordinate system with respective fields of view encompassing the region of vehicle operation in the mining environment, the method further comprising:

determining respective image positions of the vehicle from picture frames of at least two cameras; and providing the output of vehicle localization over time dependent on the respective image positions and, if available, the independent vehicle location measurement.

5. The method according to claim 1, comprising:

applying Bayesian filtering to provide the output of vehicle localization.

6. The method according to claim 5 wherein the Bayesian filtering uses a Kalman filter or a particle filter.

7. The method according to claim 1 comprising:

calibrating the camera field of view in the fixed coordinate system.

8. The method according to claim 1 wherein at least one camera is mounted on a camera support vehicle and the method comprises calibrating a field of view of the mounted camera in the fixed coordinate system.

9. A method for continuous vehicle localization in an open pit mining environment in which vehicles carrying GPS receivers operate in a region of intermittent or incomplete GPS coverage, comprising:

generating digital images with a field of view overlooking the mine region from a fixed location as vehicles move about the mine;

processing the digital images by analysing pixels of the image data and identifying interest points;

analysing the interest points to identify the presence and location of a vehicle in an image; and fusing the identified image location of the vehicle with a measurement from the corresponding vehicle GPS receiver to provide continuous vehicle localization data.

10. A system for localization of vehicles in an open pit mining environment having intermittent or incomplete GPS coverage, comprising:

GPS receivers associated with the vehicles and providing GPS measurements when available;

a camera overlooking the mine region from a known location for generating a sequence of images in a field of view with predetermined calibration in a fixed coordinate system;

a vehicle recognition processor to analyse pixels of individual images from the camera, to identify interest points, and to analyse the interest points to identify and locate within an image a vehicle in the mine region;

a vehicle tracking processor to analyse a sequence of images from the camera to track the identified vehicle location in the sequence of images; and a data fusion processor coupled to receive GPS measurements, when available, from the vehicle GPS receivers, to fuse the received GPS measurement and corresponding vehicle image location, and to output a vehicle localization output.

11. The system according to claim 10 comprising a plurality of cameras, wherein the data fusion processor fuses the received GPS measurement with corresponding vehicle image locations derived from images from the plurality of cameras.

12. The system according to claim 10 wherein the data fusion processor comprises a Bayesian filter selected from the group consisting of a Kalman filter and a particle filter.

13. The system according to claim 10 wherein at least one camera is mobile.

* * * * *